(12) United States Patent
Elliott et al.

(10) Patent No.: US 7,752,387 B2
(45) Date of Patent: Jul. 6, 2010

(54) OFFLOADING FIRMWARE UPDATE TASKS FROM RAID ADAPTER TO DISTRIBUTED SERVICE PROCESSORS IN SWITCHED DRIVE CONNECTION NETWORK ENCLOSURE

(75) Inventors: John C. Elliott, Tucson, AZ (US);
Robert A. Kubo, Tucson, AZ (US);
Gregg S. Lucas, Tucson, AZ (US);
Kenneth J. Hallam, Tucson, AZ (US);
Pauline Hallam, legal representative, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 11/386,025

(22) Filed: Mar. 21, 2006

(65) Prior Publication Data

US 2007/0226413 A1    Sep. 27, 2007

(51) Int. Cl.
*G06F 12/00* (2006.01)
(52) U.S. Cl. .................. 711/114; 711/154
(58) Field of Classification Search ........... 711/114
See application file for complete search history.

(56) References Cited

U.S. PATENT DOCUMENTS

| | | | |
|---|---|---|---|
| 6,385,683 B1 * | 5/2002 | DeKoning et al. | 710/261 |
| 6,564,307 B1 | 5/2003 | Micka et al. | |
| 6,816,950 B2 * | 11/2004 | Nichols | 711/162 |
| 6,889,345 B2 | 5/2005 | Sicola et al. | |
| 6,928,514 B2 | 8/2005 | Chatterjee | |
| 2002/0062454 A1 | 5/2002 | Fung | |
| 2002/0194428 A1 * | 12/2002 | Green | 711/114 |
| 2003/0093721 A1 | 5/2003 | King et al. | |
| 2004/0019752 A1 | 1/2004 | Burton et al. | |
| 2004/0177195 A1 | 9/2004 | Buckland | |
| 2005/0028048 A1 * | 2/2005 | New et al. | 714/54 |
| 2005/0066254 A1 | 3/2005 | Grainger et al. | |
| 2006/0277328 A1 * | 12/2006 | Cherian et al. | 710/36 |

FOREIGN PATENT DOCUMENTS

EP            1585022          10/2005

* cited by examiner

*Primary Examiner*—Shane M Thomas
(74) *Attorney, Agent, or Firm*—Dan Shifrin

(57) ABSTRACT

A storage system includes a RAID adapter, disk array switches, sub-processors, and hard disk drives. A disk-related operation is initiated in the RAID adapter which dispatches a command to a disk array processor (or sub-processor) in an enclosure for the processor to perform the operation on one or more drives. The adapter may dispatch the command to a processor in a single enclosure through a disk array switch or to processors in multiple enclosures through switches in upstream enclosures. The adapter is then free to perform other functions. The processor commences the specified operation on one or more selected drives. Upon completion of the operation, the results are transmitted by the processor and received by the adapter. Offloading the task to the distributed sub-processors reduces the burden on the RAID adapter, reduces system bandwidth usage, and enables access to other drives to be maintained.

9 Claims, 5 Drawing Sheets

OFFLOADING FIRMWARE UPDATE TASKS FROM RAID ADAPTER TO DISTRIBUTED SERVICE PROCESSORS IN SWITCHED DRIVE CONNECTION NETWORK ENCLOSURE

RELATED APPLICATION DATA

The present application is related to commonly-assigned and co-pending U.S. application Ser. Nos. 11/386,066, entitled ENCLOSURE-BASED RAID PARITY ASSIST, and 11/385,388, entitled ISOLATING FAILING DRIVE FROM DISK ARRAY FOR DIAGNOSTIC OPERATIONS, filed on the filing date hereof, which applications are incorporated herein by reference in their entireties.

TECHNICAL FIELD

The present invention relates generally to RAID storage systems and, in particular, to performing drive-related tasks with minimal impact on the RAID adapter and on the balance of the system.

BACKGROUND ART

Many computer-related systems now include redundant components for high reliability and availability. For example, in a RAID storage system, an enclosure includes an array of hard disk drives (HDDs) which are each coupled through independent ports to both of a pair of redundant disk array switches. One of a pair of redundant sub-processors may be coupled to one of the switches while the other of the pair of sub-processors may be coupled to the other switch. Alternatively, a single sub-processor may be coupled to both switches and logically partitioned into two images, each logically coupled to one of the switches. The sub-processors handle power notification and other enclosure management functions. Each switch may also be coupled through a fabric or network to both of a pair of redundant RAID adapters external to the enclosure; the adapters communicate over the fabric with the sub-processors through ports in the switches. The system may include additional enclosures, each coupled in daisy-chain fashion in the network to the disk array switches of the previous enclosure.

Conventionally, numerous tasks are performed by the RAID adapter(s) which are disk-related. In order to access a drive, the RAID adapter initiates an "open" to the drive. Whatever switches are located between the adapter and the drive are configured to establish the necessary ports dedicated to connect the drive to the adapter. If the selected drive is at the "bottom" of a series of disk enclosures, switches in all of the enclosures above it are required to be involved to establish the path from the adapter to the drive. And, while access is being made over the path, the participating ports cannot be used to transmit data to or from other drives.

For example, when disk drive firmware is to be updated, the RAID adapter opens a path with a drive to take the drive offline, downloads the firmware to update the drive, then brings the drive back online. The procedure is performed for each drive, requires substantial adapter and fabric resources and, all of the ports that were configured to establish the path from the adapter to the device being updated cannot be used to access other devices, is disruptive to the system as a whole.

By way of another example, "data scrubbing" is performed to examine a disk for latent media errors. If particular data which has been written to an area of the disk which is defective is not read very often, it may be a long time before the error is detected, possibly resulting in a data loss. By systematically accessing sectors of each disk, such defects may be identified and corrective action taken before an actual drive failure. However, again the procedure requires substantial adapter and fabric resources and tends to be disruptive to the system as a whole.

In a third example, the accidental release of sensitive data is a growing concern for any of a number of industries. Such data may include classified documents, industrial secrets and financial records, to name a few. When hard drives on which such data has been stored are taken out of service, the data may still be stored on the disk, even if it has been "erased". Moreover, performing a low level reformat is not sufficient to ensure that the data has been irrevocably destroyed since it may still be possible to recover the data from residual magnetism on the disk. Consequently, there are a number of protocols which may be implemented to ensure the destruction of data. In addition to physically destroying the disk by means of grinding and degaussing, algorithms have been developed prescribing multiple overwrites of specified data patterns in defined sequences to every location on the disk. Some methods require verification that the data stored in the locations of the disk is the pattern last updated. Strict compliance with the procedures and validation of the method is required to consider the data securely erased. Typically, utilities are written for operating systems to perform the task. When implemented in a RAID array, the use of substantial adapter and system resources is required.

Consequently, a need remains to be able to perform various disk-related maintenance operations without burdening the RAID adapters and without disrupting access to the rest of the disk array or to the network.

SUMMARY OF THE INVENTION

The present invention includes a storage system includes a RAID adapter, disk array switches, sub-processors, and hard disk drives (HDDs). A disk-related operation is initiated in the RAID adapter. The RAID adapter dispatches a command to a disk array processor (or sub-processor) in an enclosure for the processor to perform the operation on one or more drives. The adapter is then free to perform other functions. The adapter may dispatch the command to a processor in a single enclosure through a disk array switch or to processors in multiple enclosures through switches in the upstream enclosures. The processor commences the specified operation on one or more selected drives, either sequentially one at a time or more than one (or all) at a time simultaneously. Upon completion of the operation, the results are transmitted by the processor and received by the adapter. Thus, by offloading the task to the distributed sub-processors, the burden on the RAID adapter is significantly reduced, system bandwidth usage is reduced, and access to other drives within the enclosure (as well as within other enclosures) may be maintained. Tasks which may be offloaded in such a manner include, but are not limited to, drive firmware updating, drive scrubbing and secure data erasure.

DETAILED DESCRIPTION OF THE PREFERRED EMBODIMENT

Figure 1:
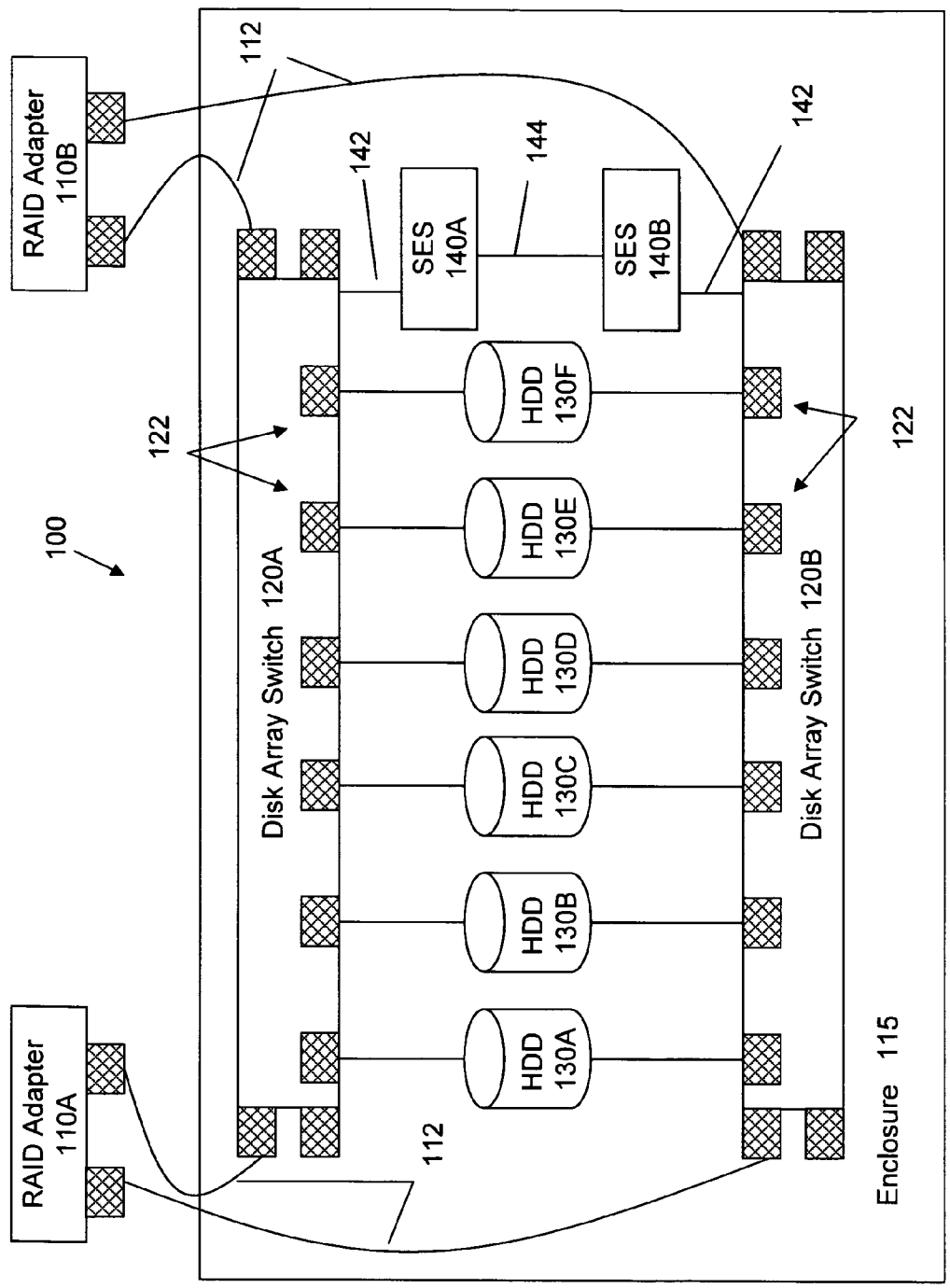
FIG. 1 is a block diagram of a RAID storage system in which the present invention may be implemented.
Figure 2:
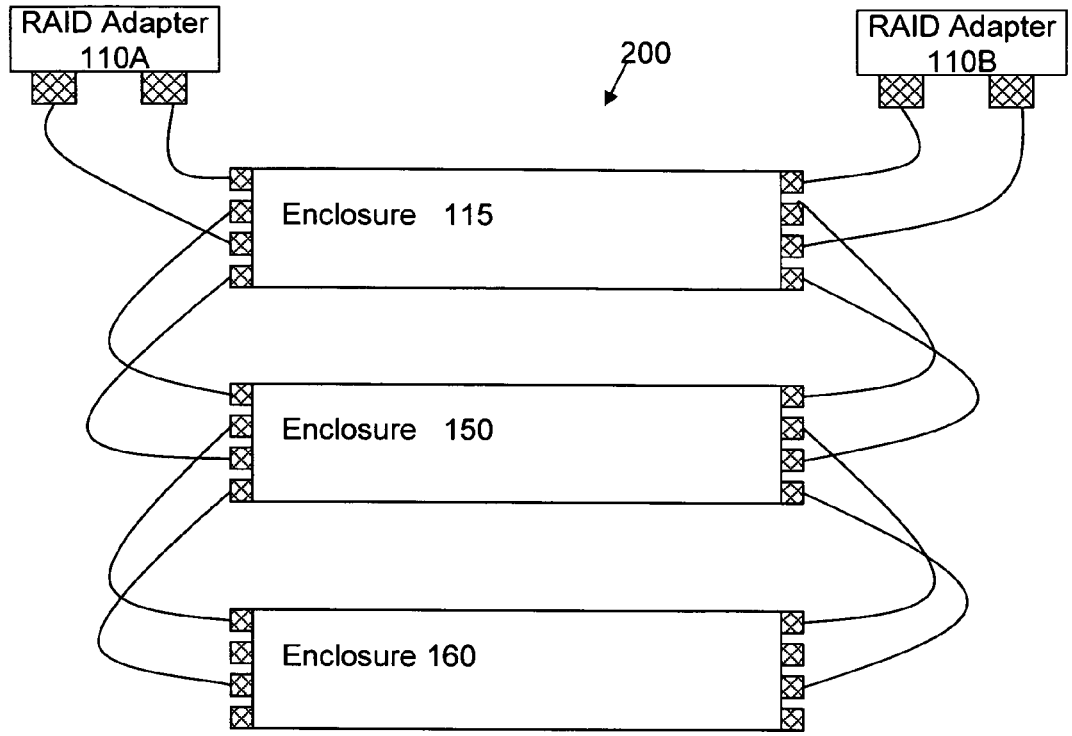
FIG. 2 is a block diagram of a RAID storage system having multiple enclosures.

FIG. 1 is a block diagram of a RAID storage system 100 in which the present invention may be implemented. The system 100 includes a redundant pair of RAID adapters or controllers 110A, 110B (collectively referred to as 110) which are coupled to one or more servers. The system 100 further includes an enclosure 115 housing a pair of redundant disk array switches 120A and 120B (collectively referred to as 120). The enclosure 115 also houses a group of hard disk drives (HDDs) 130A, 130B, 130C, 130D, 130E, 130F (collectively referred to as 130). Each HDD is coupled through ports 122 with both switches. The system 100 also includes a pair of redundant sub-processors or service processors 140A, 140B (and collectively referred to as 140), such as SCSI Enclosure Services (SES) processors, each coupled through a fabric or network 142 via one of the switches 120A, 120B. The sub-processors 140A, 140B are coupled to each other with a processor-to-processor link 144. In the system 100 illustrated, the service processors 140A, 140B are SCSI Enclosure Service (SES) processors which manage switch functions and the enclosure environment. The adapters 110 are coupled to the switches 120 through fabric or network links 112. As illustrated in FIG. 2, a system 200 may include multiple enclosures 115, 150 and 160, each coupled in daisy-chain fashion to the ports of the upstream enclosure. Thus, any communications between an adapter 110 and a switch or HDD in an enclosure passes through the switches of upstream enclosures.

The system 100 may be based on a fibre channel-arbitrated loop (FC-AL) architecture, a serial attached SCSI (SAS) architecture, or other architecture in which includes a dual-port HDD configuration.

Figure 3:
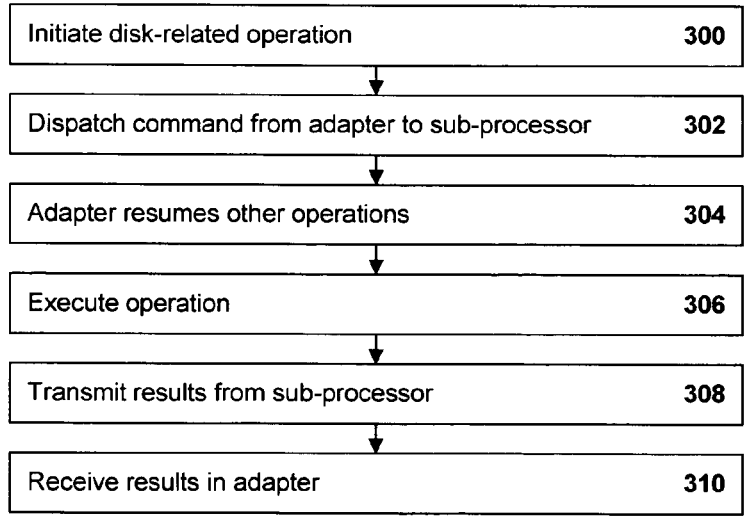
FIG. 3 is flowchart of a method of the present invention.

Referring to the flowchart of FIG. 3, a disk-related operation is initiated in the RAID adapter 110 (step 300). The RAID adapter 110 dispatches a command to a disk array processor 140 (or sub-processor) in an enclosure 115 (step 302) for the processor 140 to perform the operation on one or more drives 130 in the enclosure 115. The adapter 110 may dispatch the command to a processor in a single enclosure through a disk array switch or to processors in multiple enclosures through switches in the upstream enclosures. The adapter is then free to perform other functions (step 304). The processor 140 commences the specified operation on one or more selected drives 130, either sequentially, one at a time, or more than one (or all) at a time simultaneously (step 306). Upon completion of the operation, a notice of the results, such as "successful", is transmitted by the processor 140 (step 308) and received by the adapter 110 (step 310). Thus, by offloading the task to the distributed sub-processors 140, the burden on the RAID adapter 110 is significantly reduced. System bandwidth usage is reduced by localizing fabric traffic to the switch link between the sub-processor and the targeted drive. Access to other drives within the enclosure (as well as within other enclosures) may be maintained.

Figure 4:
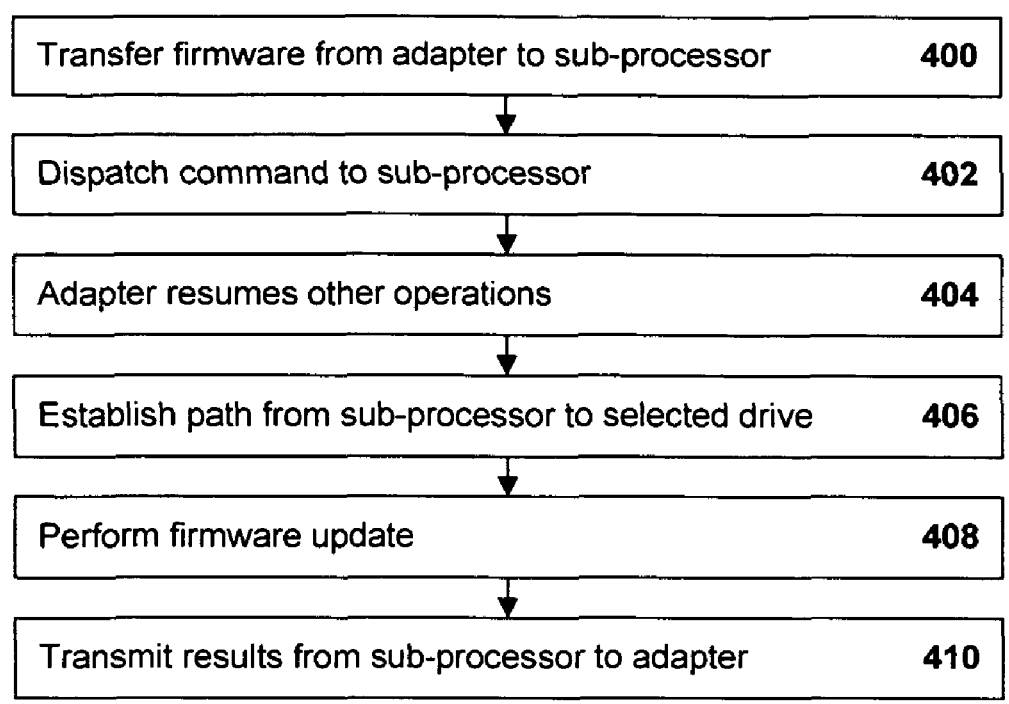
FIG. 4 is a flowchart of a method of drive firmware updating according to the present invention.

If the selected operation is a drive firmware update (FIG. 4), the adapter 110 transfers the firmware to the processor 140 which manages the enclosure-based tasks for the enclosure 115 housing one or more selected drives 130 (step 400). The adapter also dispatches an "update" command to the processor(s) 140 (step 402), including an identification of drives to be updated, and then is able to resume other operations (step 404). The processor 140 establishes a path through the switch 120 (step 406) to the selected drive(s) 130 and performs the firmware update (step 408). The update operation is isolated and access to other drives in the enclosure 115 is unaffected. Upon completion of the update, notice is transmitted by the processor 140 to the RAID adapter 110 that the update was successful or that it failed (step 410). The processor 140 may transmit such a notice after each selected drive has been updated or may transmit a single batch notice after all selected drives have been updated. It will be appreciated that the firmware in more than one drive in an enclosure may be updated, either sequentially or simultaneously, and that the firmware in drives of more than one enclosure may also be updated simultaneously.

Figure 5:
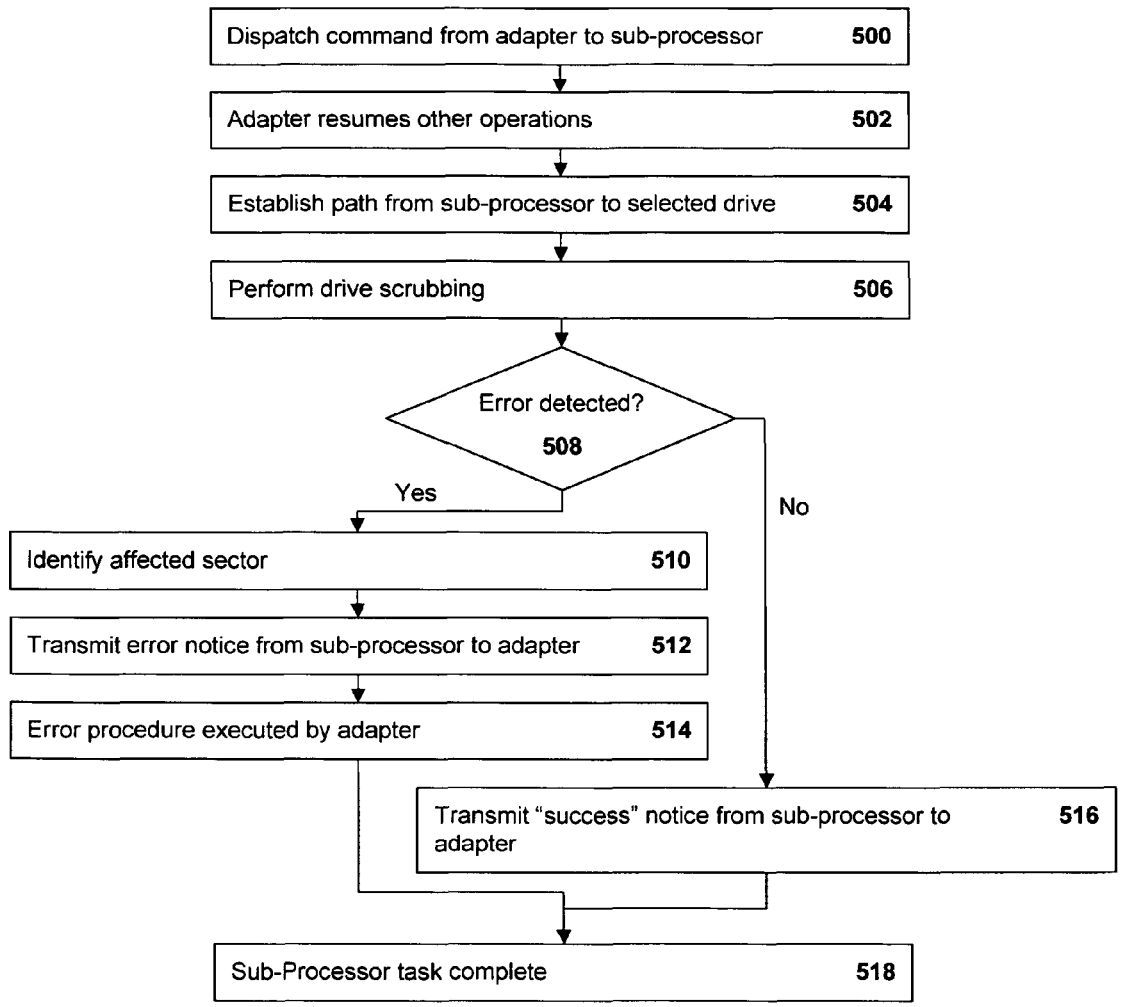
FIG. 5 is a flowchart of a method of drive data scrubbing according to the present invention.

If the selected operation is a data scrubbing operation (FIG. 5), the adapter 110 issues the appropriate command, including an identification of one or more drives to be scrubbed, to the processor 140 which manages the enclosure-based tasks for the enclosure 115 housing the selected drive(s) 130 (step 500). The adapter 110 then is able to resume other operations (step 502). The processor 140 establishes a path through the switch 120 (step 504) to the selected drive 130 and attempts to access each sector of the selected drive 130 (step 506). The scrubbing operation is isolated and access to other drives in the enclosure 115 is unaffected. If an error is detected (step 508), the affected sector is identified (step 510) and an error notice is transmitted to the adapter 110 (step 512) which may initiate appropriate procedures (step 514). Otherwise, the processor 140 transmits a "success" notice to the adapter 110 (step 516). The sub-processor task is then complete (step 518) Again, it will be appreciated that data scrubbing of more than one drive in an enclosure may be performed, either sequentially or simultaneously, and that drives of more than one enclosure may also be scrubbed simultaneously.

Figure 6:
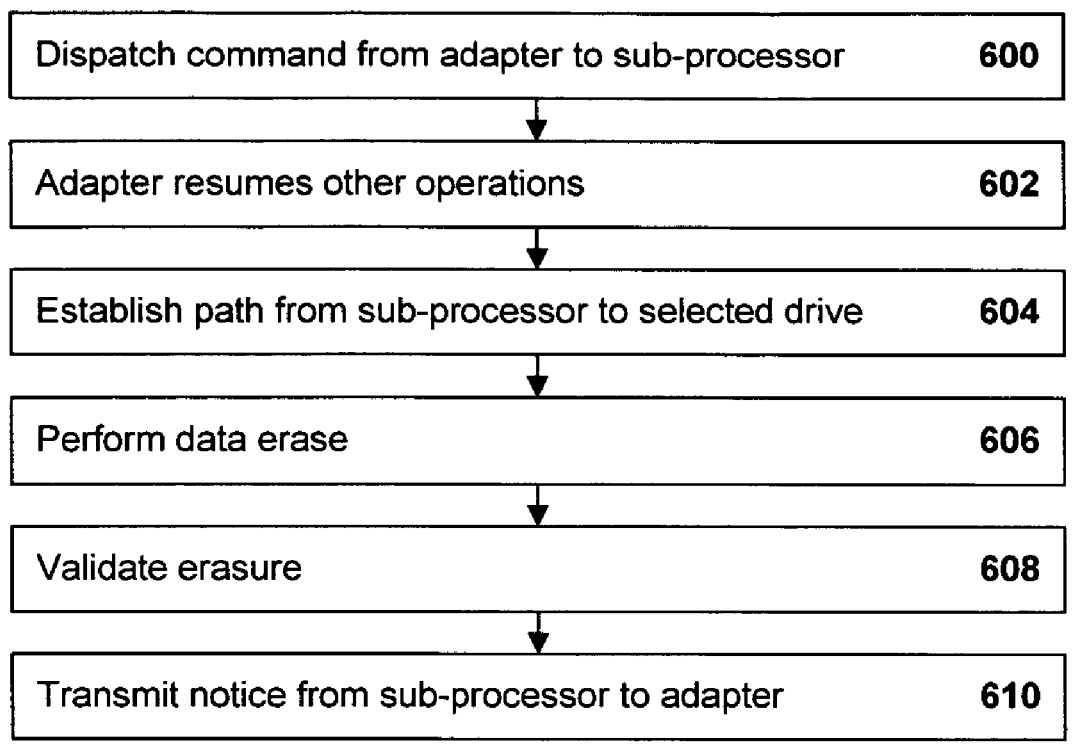
FIG. 6 is a flowchart of a method of secure data erasure according to the present invention.

If the selected operation is a secure data erasure operation (FIG. 6), the adapter 110 issues the appropriate command, including an identification of one or more drives having data to be erased and an erasure algorithm to be employed, to the processor 140 which manages the enclosure-based tasks for the enclosure 115 housing the selected drive(s) 130 (step 600). The adapter 110 then is able to resume other operations (step 602). The processor 140 establishes a path through the switch 120 (step 604) to the selected drive(s) 130 and executes the secure erase algorithm on the drive(s) 130 (step 606) by performing the required iterative write and verification cycles. The erasure operation is isolated and access to other drives in the enclosure 115 is unaffected. Upon completion and validation (step 608) of the erasure, the selected drive 130 is released back to the system (step 610) and notice is transmitted by the processor 140 to the RAID adapter 110 that the erasure was successful or that it failed (step 612). The processor 140 may transmit such a notice after each selected drive has been erased or may transmit a single batch notice after all selected drives have been erased. It will be appreciated that the data in more than one drive in an enclosure may be erased, either sequentially or simultaneously, and that the data in drives of more than one enclosure may also be erased simultaneously. In addition to reducing the burden on the adapter and on other system resources, erasing data according to the present invention allows a single erasure method to be certified rather than requiring separate methods for every operating system supported by a disk enclosure.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for executing instructions in a RAID storage system or a method for deploying computing infrastructure comprising integrating computer readable code into a computing system for executing instructions in a RAID storage system.

What we claim is:

1. A method for executing instructions in a RAID storage system having a RAID adapter, at least one array enclosure external to the RAID adapter, and a connecting fabric through which the RAID adapter and the at least one array enclosure are coupled, each enclosure including a disk array processor and a pair of redundant disk array switches, each switch coupled to an array of storage drives and to the disk array processor, the method comprising:
    a) initiating a drive firmware update operation in the RAID adapter;
    b) dispatching a command from the RAID adapter to the disk array processor in the at least one array enclosure directing the disk array processor to perform the drive firmware update operation on one or more selected storage drives in the at least one array enclosure;
    c) transferring the drive firmware update from the RAID adapter to the disk array processor;
    d) directing one of the disk array switches in the enclosure to establish a path from the disk array processor to one of the selected storage drives;
    e) isolating the one selected storage drive while allowing the disk array processor to maintain access to other storage drives in the enclosure;
    f) uploading the drive firmware update into the one selected storage drive; g) repeating steps d) through f) for each other selected storage drive;
    h) transmitting results of the drive firmware update operation from the disk array processor to the RAID adapter; and
    i) receiving the results in the RAID adapter from the disk array processor.

2. An intelligent storage enclosure adapted for communicating with a RAID adapter, external to the intelligent storage enclosure, the intelligent storage enclosure containing an array of disk drives, a pair of redundant disk array switches, each switch coupled to each disk drive, and an enclosure processor, the enclosure processor configured to execute instructions offloaded by the RAID adapter, the instructions comprising instructions for:
    a) receiving a drive firmware update command from the RAID adapter to the disk array processor for the disk array processor to perform the drive firmware update operation on one or more selected storage drives in the intelligent storage enclosure;
    b) transferring the drive firmware update from the RAID adapter to the disk array processor;
    c) directing one of the disk array switches in the enclosure to establish a path from the disk array processor to one of the selected storage drives;
    d) isolating the one selected storage drive while allowing the disk array processor to maintain access to other storage drives in the enclosure;
    e) uploading the drive firmware update into the one selected storage drive;
    f) repeating steps c) through e) for each other selected storage drive; and
    g) transmitting results of the drive firmware update operation to the RAID adapter.

3. A disk array storage system, comprising
    a RAID adapter;
    at least one array enclosure, external to the RAID adapter, each comprising:
        a pair of redundant array switches;
        an array of storage drives, each storage drive coupled to both switches; and
        disk array processor coupled to both switches;
    a connecting fabric;
    means for initiating a drive firmware update operation in the RAID adapter;
    the RAID adapter comprising means for dispatching a command to the disk array processor in at least one of the array enclosures for the disk array processor in the array enclosure to perform the drive firmware update operation on one or more selected storage drives in the enclosure and for transferring the firmware update to the disk array processor;
    the disk array processor comprising:
        a) first means for directing one of the disk array switches in the enclosure to establish a path from the disk array processor to one of the selected storage drives;
        b) means for isolating the one selected storage drive while allowing the disk array processor to maintain access to other storage drives in the enclosure;
        c) means for uploading the drive firmware update into the one selected storage drive;
        d) second means for directing the first means for directing, the means for isolating and the means for uploading to repeat their respective functions for each other selected storage drive;
        e) means for transmitting results of the drive firmware update operation to the RAID adapter; and
    the RAID adapter further comprising means for receiving the results in the RAID adapter from the disk array processor.

4. The system of claim 3, wherein:
    means for dispatching the drive firmware update command comprises means for dispatching the drive firmware update command from the RAID adapter to each disk array processor in each of a plurality of array enclosures; and
    wherein the drive firmware update operation is performed on at least one storage drive simultaneously with the drive firmware update operation in more than one array enclosure.

5. An intelligent storage enclosure adapted for communicating with a host adapter, comprising
    a pair of redundant array switches, each array switch coupled to an external RAID adapter;

an array of storage drives, each storage drive coupled to both array switches through respective ports;

an array processor coupled to both array switches, the array processor configured to:
  a) receive a command from the RAID adapter to perform a drive firmware update operation on one or more selected storage drives in the array of storage drives;
  b) transfer the drive firmware update from the RAID adapter to the disk array processor;
  c) direct one of the array switches in the intelligent storage enclosure to establish a path from the disk array processor to one of the selected storage drives;
  d) isolate the one selected storage drive while allowing the disk array processor to maintain access to other storage drives in the enclosure;
  e) upload the drive firmware update into the one selected storage drive;
  f) repeat steps c) through e) for each other selected storage drive; and
  e) transmit results of the drive firmware update operation to the RAID adapter.

6. A computer program product stored on a recordable-type computer readable medium usable with a programmable computer, the computer program product having computer-readable code embodied therein for executing instructions in a RAID storage system having a RAID adapter, at least one array enclosure external to the RAID adapter, and a connecting fabric through which the RAID adapter and the at least one array enclosure are coupled, each enclosure including a disk array processor and a pair of redundant disk array switches, each switch coupled to an array of storage drives and to the disk array processor, the computer-readable code comprising instructions for:
  a) initiating a drive firmware update operation in the RAID adapter;
  b) dispatching a command from the RAID adapter to the disk array processor in the at least one array enclosure directing the disk array processor to perform the drive firmware update operation on one or more selected storage drives in the at least one array enclosure;
  transferring the drive firmware update from the RAID adapter to the disk array processor;
  d) directing one of the disk array switches in the enclosure to establish a path from the disk array processor to one of the selected storage drives;
  e) isolating the one selected storage drive while allowing the disk array processor to maintain access to other storage drives in the enclosure;
  f) uploading the drive firmware update into the one selected storage drive;
  g) repeating instructions d) through f) for each other selected storage drive;
  h) transmitting results of the drive firmware update operation from the disk array processor to the RAID adapter; and
  i) receiving the results in the RAID adapter from the disk array processor.

7. The computer program product of claim 6, wherein:
instructions for dispatching the drive firmware update command from the RAID adapter comprise instructions for dispatching the drive firmware update command from the RAID adapter to each disk array processor in each of a plurality of array enclosures; and
instructions for performing the drive firmware update operation comprise instructions for performing the drive firmware update operation on at least one storage drive simultaneously with the drive firmware update operation in the plurality of array enclosures.

8. A method for deploying computing infrastructure, comprising integrating computer readable code into a RAID storage system having a RAID adapter, at least one array enclosure external to the RAID adapter, and a connecting fabric through which the RAID adapter and the at least one array enclosure are coupled, each array enclosure including a disk array processor and a pair of redundant disk array switches, each disk array switch coupled to an array of storage drives and the disk array processor, wherein the code, in combination with the computing system, is capable of performing the following:
  a) initiating a drive firmware update operation in the RAID adapter;
  b) dispatching a command from the RAID adapter to the disk array processor in the array enclosure directing the disk array processor to perform the drive firmware update operation on one or more selected storage drives in the array enclosure;
  c) transferring the firmware update from the RAID adapter to the disk array processor;
  d) directing one of the disk array switches in the enclosure to establish a path from the disk array processor to one of the selected storage drives;
  e) isolating the one selected storage drive while allowing the disk array processor to maintain access to other storage drives in the enclosure;
  f) uploading the firmware update into the one selected storage drive;
  g) repeating steps d) through f) for each other selected storage drive;
  h) transmitting results of the drive firmware update operating from the disk array processor to the RAID adapter; and
  i) receiving the results in the RAID adapter from the disk array processor.

9. The method of claim 8, wherein:
dispatching the drive firmware update command from the RAID adapter comprises dispatching the drive firmware update command from the RAID adapter to each disk array processor in each of a plurality of array enclosures; and
repeating steps d) through f) comprise repeating steps d) through f) in each disk array processor in each of the plurality of array enclosures in order to perform the drive firmware update operation on at least one storage drive simultaneously with the drive firmware update operation in more than one array enclosure.

* * * * *